R. GRAY.
Gate.
No. 200,655. Patented Feb. 26, 1878.
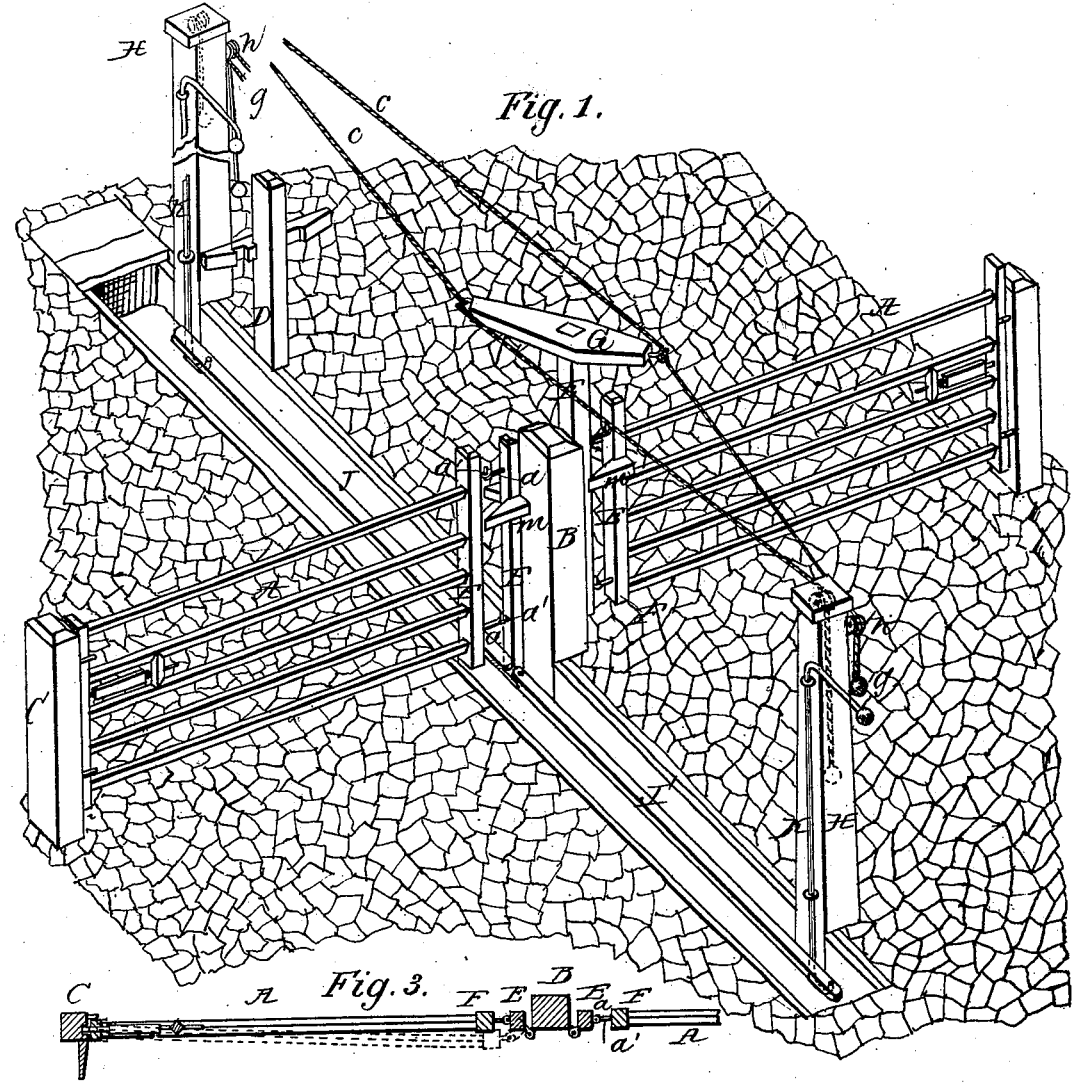
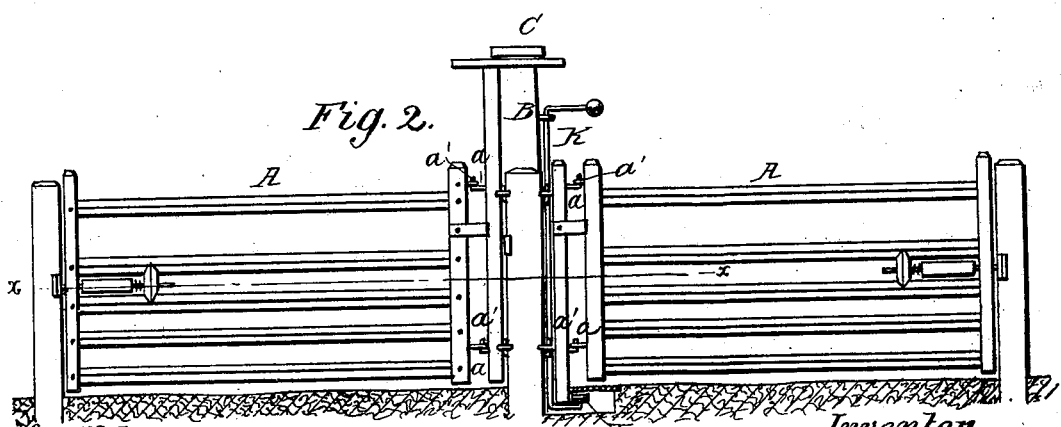
Witnesses
A. Tauberschmidt
Fritz Dietrich
Inventor
Richard Gray
by DeWitt C. Allen atty.

UNITED STATES PATENT OFFICE.

RICHARD GRAY, OF BLOOMINGTON, ILLINOIS, ASSIGNOR TO THOMAS J. GRAY, OF GOODLAND, INDIANA.

IMPROVEMENT IN GATES.

Specification forming part of Letters Patent No. 200,655, dated February 26, 1878; application filed November 1, 1877.

*To all whom it may concern:*

Be it known that I, RICHARD GRAY, of Bloomington, in the county of McLean and State of Illinois, have invented certain new and useful Improvements in Swinging Gates; and I do hereby declare the following to be a full, clear, and exact description of the same, reference being made to the accompanying drawings, forming a part of this specification, and in which—

Figure 1 is a perspective view. Fig. 2 is a sectional elevation of the gate, showing parts of the underground devices for operating the gate; and Fig. 3 is a sectional view on the line $x$ $x$ of Fig. 2.

This invention relates to improvements in that class of swinging gates in which a swinging post is arranged between the stationary post and the rear stile of the gate; and the invention consists in the combination, with a stationary post, of a swinging post hinged thereto and to the rear stile of the gate, said stile and swinging post being hinged together by long and short arms reversely secured to near the top and bottom of said stile and post.

It further consists in the combination, with a gate and swinging post, of ears projecting from the latter, for the purpose of facilitating the opening of the gate against the wind in case of very high winds.

It finally consists in the combination, with the swinging post and gate, of devices for operating the swinging gate and post, all as hereinafter fully described.

In the drawings, A A represent farm or other gates, and B, a large stationary post set firmly in the ground. C represents one of the posts against which the gates are closed, and D one of the posts against which the gates are retained when opened. E E represent swinging posts hinged to the corners of the stationary posts B, with like hinges at top and bottom, whereby the swinging posts always maintain a perpendicular position. F F represent the rear stiles of the gates, which are hinged to the swinging posts by two hinges arranged in the following manner: The long arm $a$ of the top hinge is secured to the swinging posts, and the short arm $a'$ secured to the gate-stiles, while the position of the long and short arms of the bottom hinge is reversed, so that the long arm $a$ is secured to the gate-stile and the short arm $a'$ to the swinging post.

The object which is attained by hinging the gate to the swinging post, as above described, is that, when the swinging post is turned, either by means of the underground devices or by the devices above ground, to be hereinafter described, the gate is raised or elevated at its forward end, and inclined toward the side to which the gate is designed to swing, and as the swinging post turns farther around the whole gate is drawn back from the catch and post, which releases the gate and allows it to swing open by its own weight, and when the swinging post is turned back the same motions are produced in the opposite or reverse direction, which allows the gate to be closed in the same manner.

The novel features for operating the swinging post are arranged under the ground, as shown in the drawing. The lower end of the swinging post is provided with a crank-arm, I, having secured thereto one end of each of the connecting-rods J J', which are inclosed in suitable boxes under the ground, and said connecting-rods extend in opposite directions out to the high posts H, and to the ends of these connecting-rods are secured the lower ends of the vertical crank-spindles K, journaled to the posts H, and which are provided upon their upper ends with weighted arms, by which they are operated.

The swinging post is operated by the person pulling the weighted arm toward him upon approaching the gate, or pushing the arm from him when passing away from the gate, which will respectively open or close the gate in the manner before described.

I have also shown another old and well-known means for operating the swinging post, which I will proceed to describe. To the top of the swinging post is secured a transverse bar, G, having cords or chains $c$ $c$ secured to its opposite ends, and these cords extend over pulleys $h$ on the high posts H, and are provided with weights $g$, all as clearly shown in Fig. 1. By pulling one of the cords or chains that pass over the pulleys on the post, when approaching or leaving the gate in either direction, the swinging post will be turned, thereby opening or closing the gate in the manner heretofore described.

The posts H should be arranged at a sufficient distance from the gate to not frighten the horses in opening or closing it.

m m are projecting ears arranged upon the swinging post. These projecting ears form important attachments to the gate, as they enable the operator to force the gate open against the wind in case of high winds.

The above-described swinging gate is very simple in its construction and operation, and has one very important advantage over most automatic gates, which are required to be light, in that it works better upon being reasonably heavy, the opening and closing of the gate depending wholly on changes of the center of gravity.

One of the advantages derived from the swinging post hinged to the stationary post and to the gate-stile, as above described, is that the whole gate is drawn backward when the swinging post is turned, which enables me to use the common spring-latch, which is easily constructed and repaired, and this kind of spring-latch permits considerable sagging of the gate without interfering with its operation.

The swinging post also permits of the use of the ordinary gate-hinges, thereby lessening the cost of construction.

I am also able to operate the gate by devices arranged either above or below the ground, as may be found most expedient.

I am aware that swinging posts and cranked spindles arranged between the stationary post and the rear stile of the gate, and also crank-arms and connecting-rods for opening the same, are old; and such I do not claim broadly as my invention; but

I claim as my invention—

1. The combination, with the stationary post B, of the swinging post E, hinged thereto, as shown, and the gate with its rear stile F, said post and stile E F hinged together by long and short arms reversely secured to near the top and bottom of said post and stile, whereby the whole gate is drawn backward when the swinging post is turned, substantially as herein shown and described.

2. The combination, with the gate and swinging post, of the projecting ears m, substantially as and for the purpose specified.

3. The combination, with the gate, swinging post, crank-arm I, and connecting-rods J J', of the vertical weighted crank-spindles K and posts H, the several parts constructed and arranged to operate substantially as herein shown and described.

RICHARD GRAY.

Witnesses:
THOS. SLADE,
IRVING UNDERHILL.